United States Patent [19]

Nishijima

[11] Patent Number: 5,001,746
[45] Date of Patent: Mar. 19, 1991

[54] TRANSMISSION CONTROL UNIT

[75] Inventor: Noriaki Nishijima, Kawanishishi, Japan

[73] Assignee: Shirohato Yakuhin Co., Ltd., Osaka, Japan

[21] Appl. No.: 421,927

[22] Filed: Oct. 16, 1989

[30] Foreign Application Priority Data

Oct. 29, 1988 [JP] Japan .......................... 63-141665[U]
May 26, 1989 [JP] Japan ............................. 1-61097[U]

[51] Int. Cl.$^5$ ........................................ H04M 11/00
[52] U.S. Cl. ...................................... 379/99; 379/443; 379/444
[58] Field of Search .................. 379/99, 443, 444, 98, 379/97, 93

[56] References Cited

U.S. PATENT DOCUMENTS

| | | | |
|---|---|---|---|
| 3,647,972 | 3/1972 | Glover et al. | 379/444 |
| 3,663,757 | 5/1972 | Cassidy | 379/99 |
| 4,203,006 | 5/1980 | Mascia | 379/443 |
| 4,288,661 | 9/1981 | Krishan | 379/443 |
| 4,599,491 | 7/1986 | Serrano | 379/444 |

Primary Examiner—Jin F. Ng
Assistant Examiner—Stella L. Woo
Attorney, Agent, or Firm—Leighton K. Chong

[57] ABSTRACT

A transmission control unit disclosed is used when an electronic device which is usually directly connected to a telephone line is used via a public telephone or the like. In this case, the transmission control unit is connected to a MODEM included in the electronic device, and a microphone and a speaker of the transmission control unit are brought to confront the speaker and the microphone of the telephone. When the transmission to the electronic device on the other end of the line is conducted, tone dialing is conducted to make a call and data is then transmitted. The thus transmitted data is converted by a converter of the transmission control unit so as to be transmitted to the telephone line connected to the other end of the line, while data from the electronic device on the other end of the line is transmitted and converted so as to be supplied to the MODEM. Therefore, a simply-structured and detachable transmission control unit enables data transmission and receipt via the public telephone simply by installing the transmission control unit.

9 Claims, 5 Drawing Sheets

5,001,746

TRANSMISSION CONTROL UNIT

BACKGROUND OF THE INVENTION

1. Field of the Invention

The present invention relates to a transmission control unit for use in the transmission and reception of data between portable electronic devices such as portable word processors and lap-top personal computers over a public telephone.

Conventionally, there is a known electronic device having a modulator/demodulator (MODEM) or an acoustic coupler for the purpose of transmitting and/or receiving data to and from an electronic device on the other end of the line.

FIG. 5 is a structural view of an electronic device including a MODEM, the electronic device 50 of this type being used in such a manner that a MODEM 51 thereof is directly connected to a telephone line 52 so as to call an electronic device on the other end of the line by using a tone dial. FIG. 6 is a structural view of an electronic device including an acoustic coupler, where a microphone 62 and a speaker 63 are installed therein via a MODEM 61 so that a connection with a telephone line 52 is established by dialing a call with the microphone 62 and the speaker 63 caused to confront a speaker 64 and a microphone 65 of a telephone 66.

There is a requirement that the electronic device including the MODEM usually directly connected to the telephone line can be connected to the telephone line over a public telephone or the like in the place where the user is.

However, the electronic device 50 of the type shown in FIG. 5 is not designed to be used via a public telephone so that it is impossible to connect the electronic device 50 to the telephone line via the public telephone. In the case of the electronic device 60 of the type shown in FIG. 6, it cannot be used while connected directly to the telephone line 52. Furthermore, the electronic device 60 encounters a problem in that the dial must be turned when it is connected to the telephone line 52 via a public telephone.

In Japanese Utility Model Laid-Open No. 64-11046, a telephone which also serves as an acoustic coupler is disclosed. In this telephone, an acoustic coupler and a telephone unit are mounted on a base in such a manner that a transmitter and a receiver of the acoustic coupler can swing on the base so that the transmitter and the receiver are caused to confront the handset of the telephone. Furthermore, a belt is provided for the base for the purpose of fixing the transmitter and the receiver to the handset of the telephone. When the telephone which also serves as an acoustic coupler is used to communicate with, for example, a portable facsimile, the structure of the facsimile device can be simplified since a telephone which also serves as an acoustic coupler can be connected to the facsimile as an alternative to separately connecting the acoustic coupler and the telephone. However, since the acoustic coupler and the telephone are mounted on the base, it is not suitable to be used via a public telephone. Furthermore, dialing must be conducted by pressing the push buttons when the telephone which also serves as an acoustic coupler is connected to the telephone line.

SUMMARY OF THE INVENTION

An object of the present invention is to provide a small size transmission control unit capable of connecting an electronic device, which is usually directly connected to a telephone line, to the telephone line via a public telephone or the like.

A further object of the present invention is to provide a transmission control unit which can be used regardless of the type of the MODEM included in the electronic device.

In order to achieve the objects, there is provided a transmission control unit comprising:
acoustic input means:
acoustic output means: and
matrix conversion means capable of, in a predetermined manner, matrix-converting a signal transmitted from a MODEM included in an electronic device so as to be supplied to the acoustic output means, and capable of, in a predetermined manner, matrix-converting a signal transmitted from the acoustic input means so as to be supplied to the MODEM, the transmission control unit being arranged to be detachable with respect to the electronic device.

The transmission control unit according to the present invention may be provided with an electric current adjustment means capable of adjusting an electric current which passes when a connection with the MODEM is established.

DESCRIPTION OF THE PREFERRED EMBODIMENT

Figure 1:
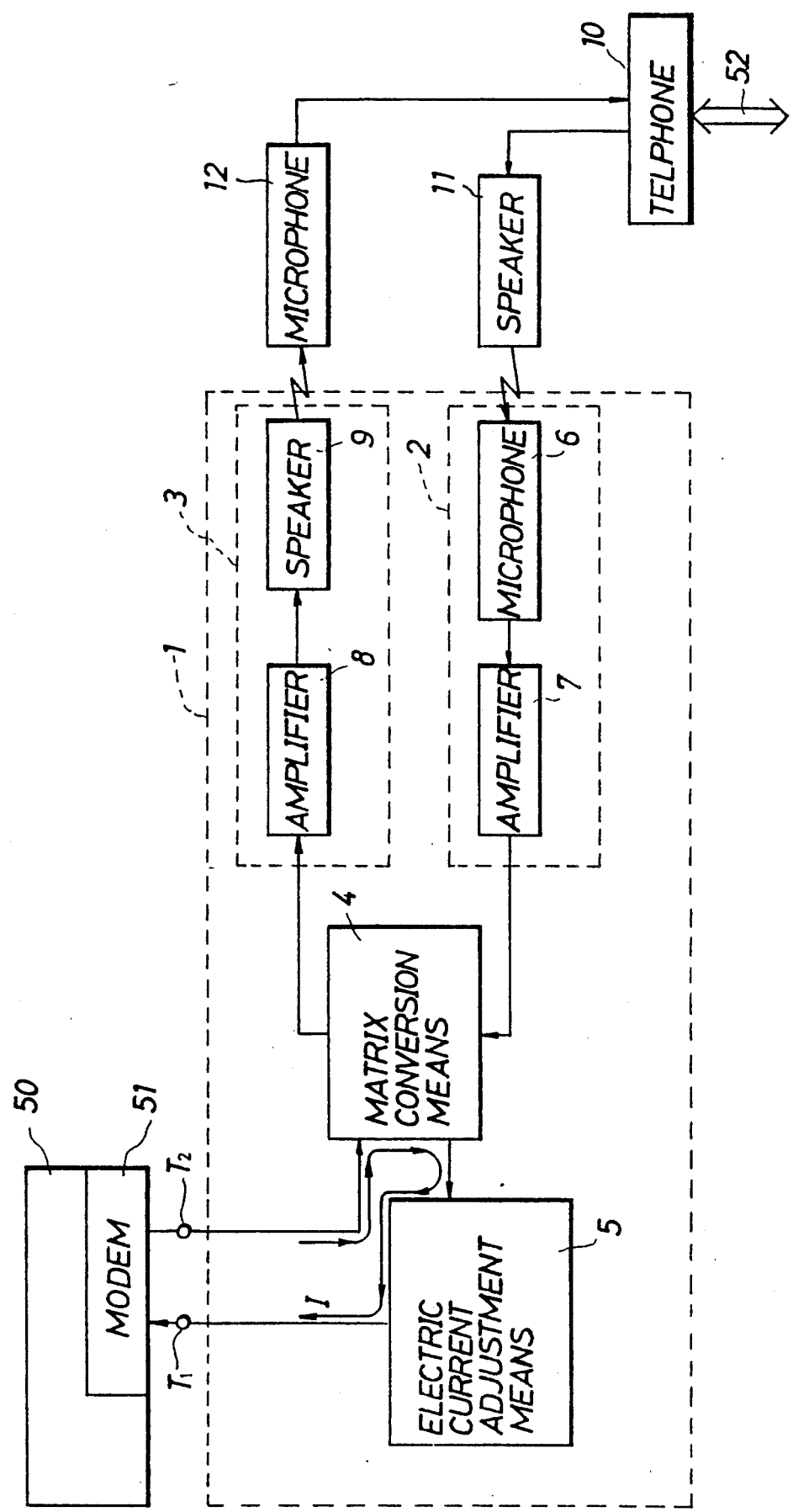
FIG. 1 is a structural view of an embodiment of a transmission control unit according to the present invention.

Referring to FIG. 1, a transmission control unit 1 comprises: an acoustic input means 2; an acoustic output means 3; a matrix conversion means 4 capable of matrix-converting a signal from a MODEM 51 of a portable electronic device 50 in a predetermined manner so as to supply it to the acoustic output means 3 and also capable of matrix-converting a signal from the acoustic input means 2 in a predetermined manner so as to supply it to the MODEM 51; and an electric current adjustment means capable of adjusting an electric current which passes when a connection with the MODEM 51 is established, the transmission control unit 1 being detachably mounted to the electronic device 50.

The acoustic input means 2 comprises: a microphone 6 capable of receiving an acoustic signal from a speaker 11 of a telephone 10 and as well capable of converting the acoustic signal into an electronic signal; and an amplifier 7 capable of amplifying the electronic signal supplied from the microphone 6. The acoustic output means 3 comprises: an amplifier 8 capable of amplifying the signal supplied from the matrix conversion means 4; and a speaker 9 capable of converting the electric signal supplied from the amplifier 8 into an acoustic signal and as well capable of supplying the acoustic signal to the microphone 12 of the telephone 10. The matrix conversion means 4 is arranged to be capable of converting two-wire from the MODEM 51 into four-wire, that is, it can conduct a so-called "two-wire to four-wire conversion".

Figure 2:
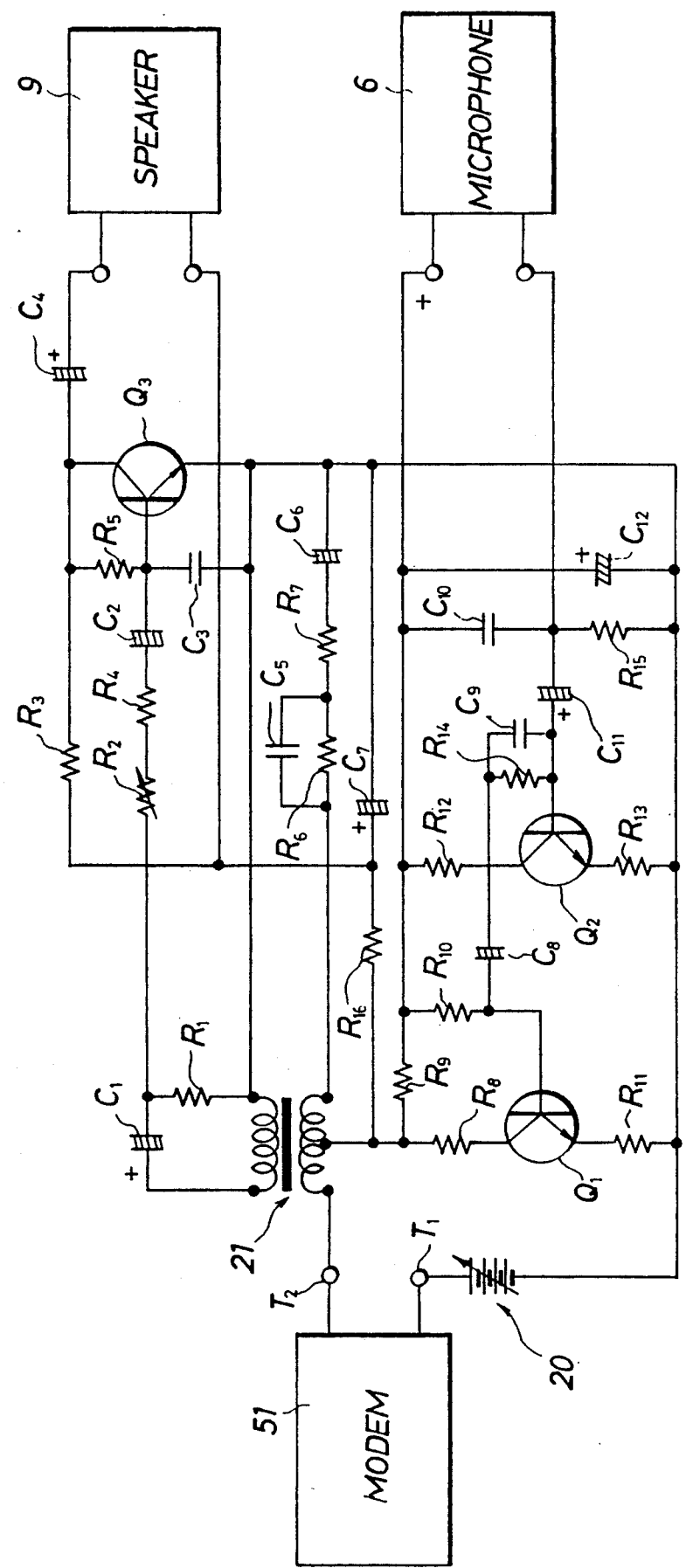
FIGS. 2, 3 and 4 are views of specific examples of the transmission control unit shown in FIG. 1.
Figure 3:
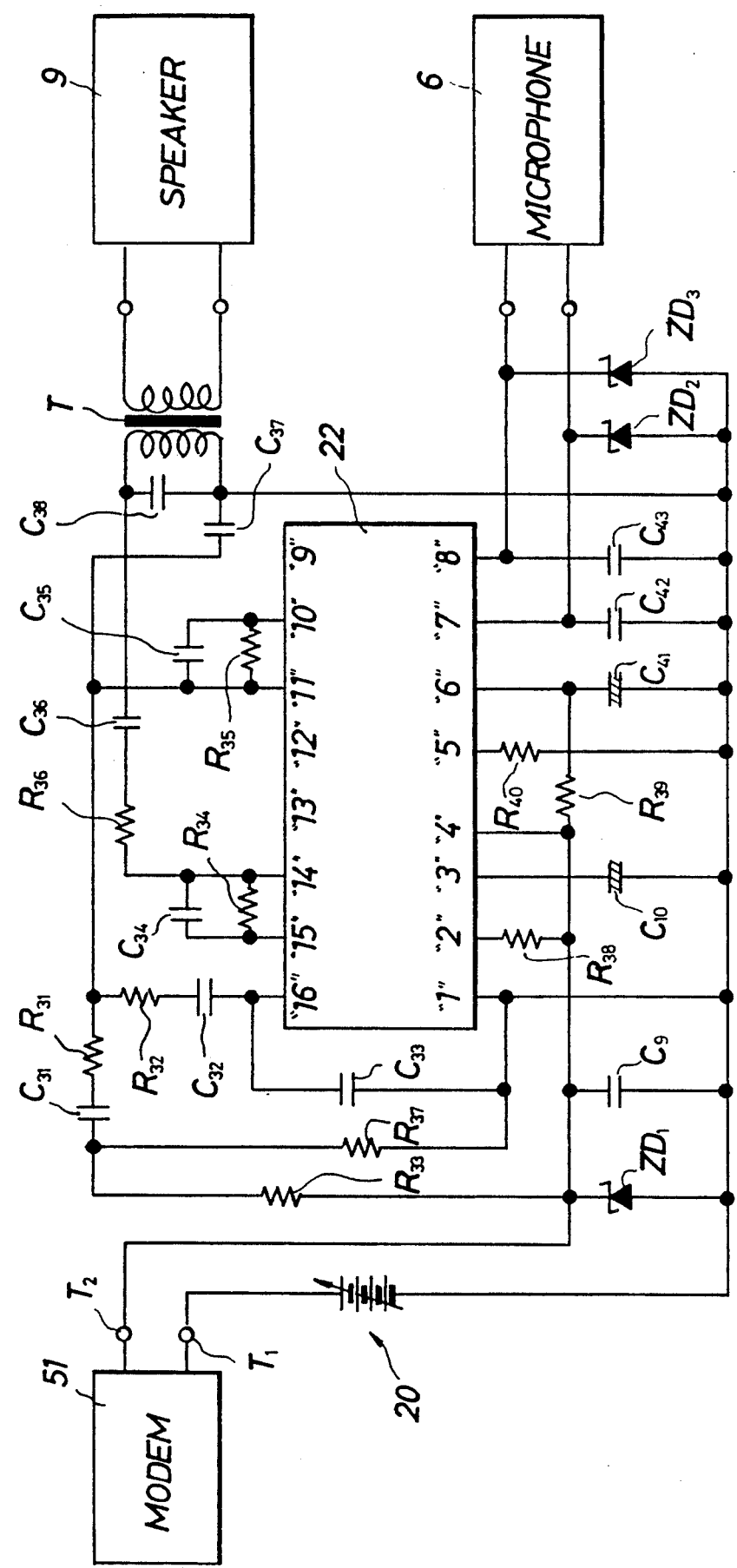
Figure 4:
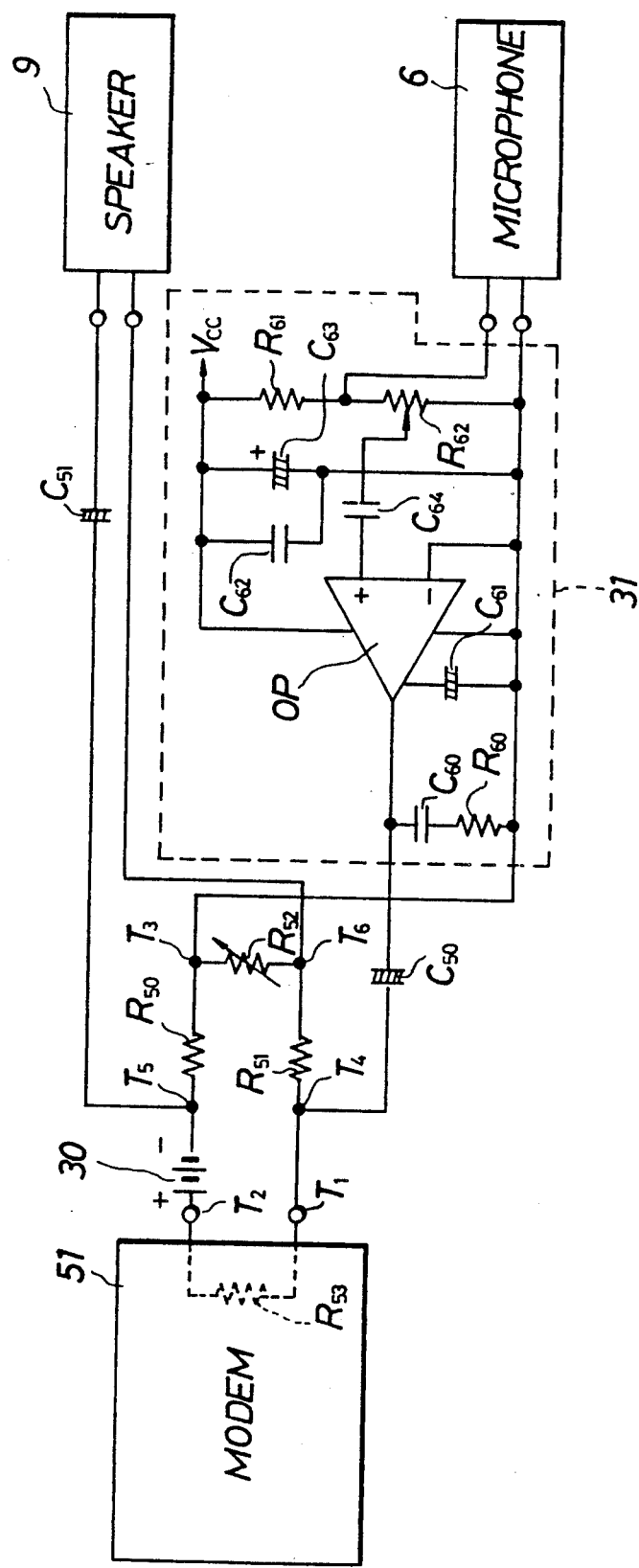
Figure 5:
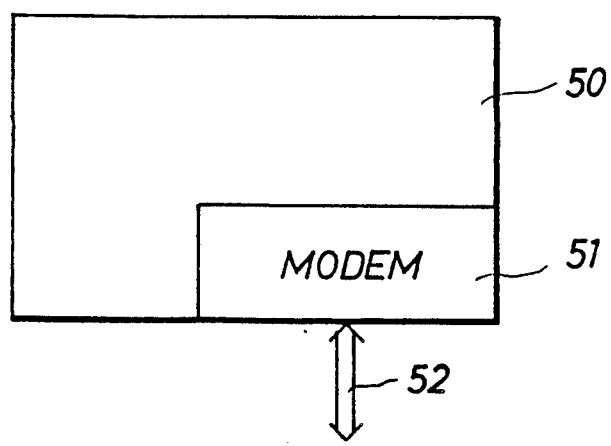
FIG. 5 is a structural view of a general electronic device which includes a MODEM.
Figure 6:
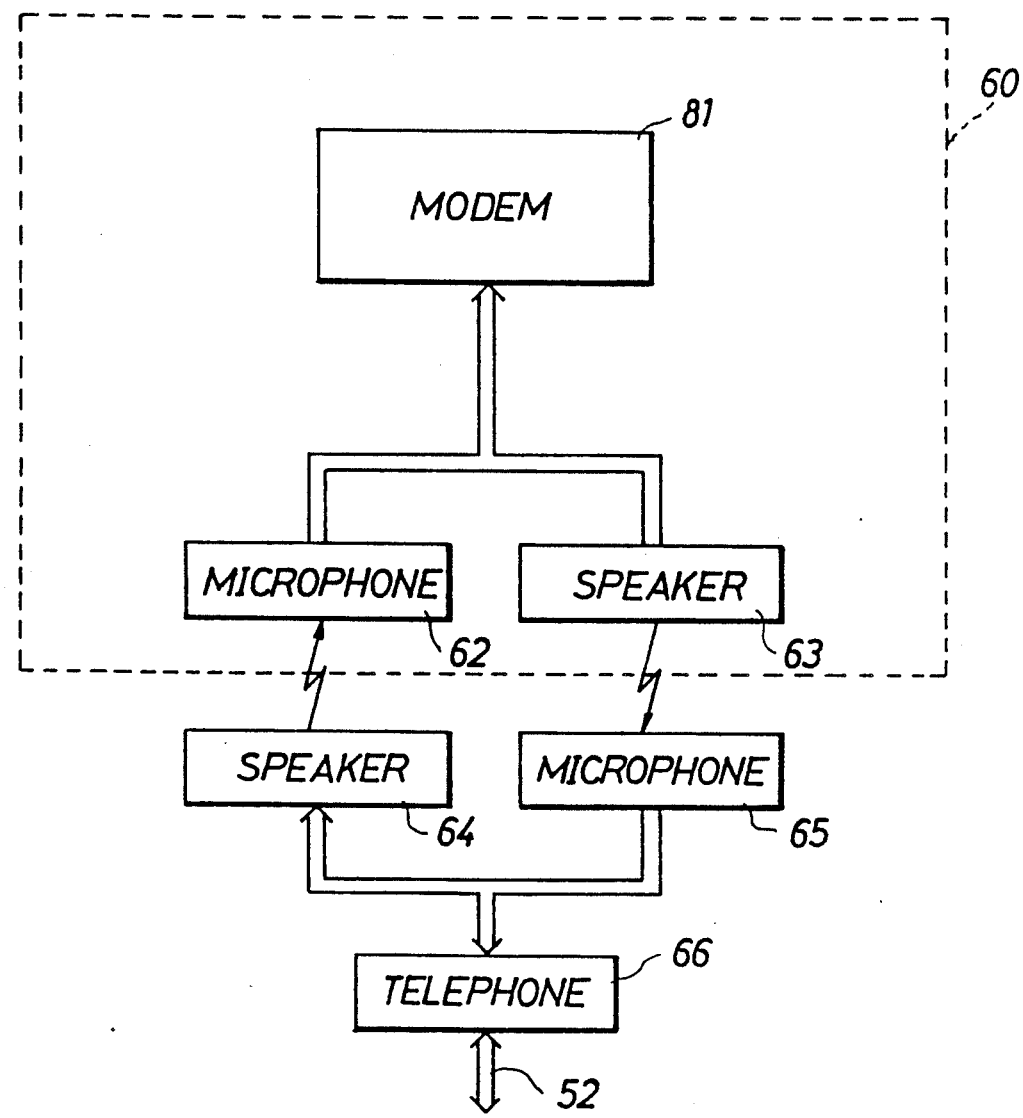
FIG. 6 is a structural view of a conventional electronic device in which an acoustic coupler is used.

FIGS. 2, 3, and 4 are views which specifically illustrate the transmission control unit shown in FIG. 1. Referring to FIGS. 2 and 3, the electric current adjustment means 5 is realized by a power source 20 capable of generating variable voltage of, for example, 6 V to 12 V. The matrix conversion means 4 is realized by a transformer 21 in FIG. 2, the matrix conversion means 4 being disposed, in FIG. 3, in a communication amplifier 22 such as BA6562 manufactured by Rohm. The amplifiers 7 and 8 are structured by transistor logics in FIG. 2, they being disposed in the communication amplifier 22 in FIG. 3. Referring to FIG. 2, resistors R1, R2, R3, R4, R5, R6, R7, R8, R9, R10, R11, R12, R13, R14, R15, and R16 are respectively arranged to be, for example, 1.2 KΩ, 10 KΩ, 1 KΩ, 2.2 KΩ, 10 KΩ, 560 Ω, 220 Ω, 10 Ω, 2.2 KΩ, 56 KΩ, 22 Ω, 4.7 KΩ, 39 Ω, 56 KΩ, 2.2 kΩ, and 390 Ω. Capacitors C1, C2, C3, C4, C5, C6, C7, C8, C9, C10, C11, and C12 are respectively arranged to be, for example, 47 μF, 10 μF, 0.01 μF, 10 μF, 0.1 μF, 47 μF, 47 μF, 0.1 μF, 0.0022 μF, 0.033 μF, 0.1 μF, and 47 μF. Transistors Q1, Q2, and Q3 comprise respectively, for example, 2SD602A, 2SD601, and 2SD601. Referring to FIG. 3, resistors R31, R32, R33, R34, R35, R36, R37, R38, R39, and R40 are respectively arranged to be, for example, 10 KΩ, 10 KΩ, 16.9 KΩ, 8.2 KΩ, 18 KΩ, 3.9 KΩ, 1 KΩ, 39 Ω, 1.5 KΩ, 6.8 KΩ. Capacitors C31, C32, C33, C34, C35, C36, C37, C38, C39, C40, C41, C42, and C43 are respectively arranged to be, for example, 0.033 μF, 0.033 μF, 0.03 μF, 2200 PF, 2200 PF, 0.1 μF, 0.001 μF, 0.001 μF, 6800 PF, 22 μF, 220 μF, 0.01 μF, and 0.01 μF. Zener diodes ZD1, ZD2, and ZD3 are respectively arranged to have an terminal voltage of, for example, 15 V, 5.1 V, and 5.1 V. Transformer T comprises, for example, LT2030.

Referring to FIG. 4, the electric current adjustment means 5 is realized by a power source 30 capable of generating variable voltage. Furthermore, in the specific example shown in FIG. 4, the matrix conversion mean 4 is structured by a resistor bridge circuit comprising resistors R50 and R51, a variable resistor R52, and an inner A.C. resistor R53 in the MODEM 51. That is, an electric signal supplied from the microphone 6 is amplified by an amplifier 31, and then the D.C. component of the electric signal is cut by a capacitor C50. It is then supplied to terminals T3 and T4 in the resistor bridge circuit so as to be subjected to a 2-wire to 4-wire conversion. Thus, the signal is supplied to the MODEM 51 via terminals T1 and T2. On the other hand, a signal from the MODEM 51 is supplied to the terminals T4 and T5. It is then transmitted from the terminals T5 and T6 to the speaker 9 via a capacitor C51 capable of cutting the D.C. component. The resistors R50 and R51 and the variable resistor R52 are respectively arranged to be about "620 Ω", "620 Ω", and "600 Ω" in a case where the inner A.C. resistor R53 in the MODEM 51 is arranged to be, for example, about "600 Ω". Furthermore, the capacitors C50 and C51 provided for the purpose of cutting the D.C. components are arranged to be about "10 μF", respectively. Resistors R60, R61, and R62 in the amplifier 31 shown in FIG. 4 are respectively arranged to be, for example, about "10 Ω", "4.7 kΩ", and "1 kΩ". Capacitors C60, C61, C62, C63, and C64 are respectively arranged to be about "0.1 μF", "10 μF", "0.1 μF", "100 μF", and "1 μF". An operational amplifier OP comprises, for example, "LM386". In addition, voltage Vcc is arranged to be, for example, "4.9" to "9" V.

Then, the operation of the thus structured transmission control unit will be described.

Referring to FIG. 1, the portable electronic device 50 is usually disposed at a proper position in a room so as to be used such that it is directly connected to the telephone line 52. In this case, the transmission control unit 1 according to this embodiment is not used. When the electronic device 50 is carried by a user so as to be connected to the electronic device on the other end of the line via, for example, a public telephone in the place where the user is, the user needs to connect the terminals T1 and T2 of the transmission control unit 1 according to this embodiment to the two terminals of the MODEM 51 of the electronic device 50. Furthermore, the microphone 6 and the speaker 9 are brought to confront the corresponding speaker 11 and the microphone 12 of the telephone 10. If necessary, the voltage of the electric current adjustment means, that is, the power source 20 is then adjusted. This adjustment is conducted for the purpose of adjusting current I which passes within a closed loop as shown in FIG. 1 when the transmission control unit 1 is connected to the MODEM 51. As a result of this adjustment, the voltage of the power source can be adjusted so as to cause the on-hook and off-hook control function in the MODEM 51 to operate correctly even if the other type of the MODEM 51 to be connected to the transmission control unit 1 is employed.

Then, when data is intended to be transmitted to the electronic device on the other end of the line, a tone signal is dialed from the electronic device 50. The thus dialed tone signal is supplied from the MODEM 51 to the matrix conversion means 4 in which it is subjected to the 2-wire to 4-wire conversion. It is then supplied to the microphone 12 of the telephone 10 via the acoustic output means 3. As a result, a telephone call is established so that data can be transmitted form the electronic device 50 to the electronic device on the other end of the line. That is, data is, similarly to the tone signal, transmitted to the microphone 12 via the MODEM 51, the matrix conversion means 4, and the acoustic output means 3.

On the other hand, data from the electronic device on the other end of the line is transmitted through the speaker 11 via the telephone line 52, the data being transmitted in the form of sound. The thus transmitted data is received by the acoustic input means 2. The data is then subjected to the 2-wire to 4-wire conversion by the matrix conversion means 4 before it is supplied to the MODEM 51 of the electronic device 50 in which the signal receipt is completed.

According to the specific example shown in FIG. 4, the bridge circuit is allowed to come to equilibrium by adjusting the variable resistor R52 after the transmission control unit 1 has been connected to the MODEM 51 of the electronic device 50. As a result, the electronic signal from the microphone 6 is transmitted to the MODEM 51 with the amplitude thereof substantially halved without any leakage to the speaker 9 after it has been supplied to the terminals T3 and T4 of the bride circuit. On the other hand, the signal from the MODEM 51 is transmitted to the speaker 9 with the amplitude thereof substantially halved without any leakage to the microphone 6 after it has been supplied to the terminals T4 and T5 of the bride circuit.

As described above, since the transmission control unit 1 according to this embodiment is structured simply as specifically illustrated in FIGS. 2, 3, and 4 (in particular, the specific example shown in FIG. 4 displays an extremely simple structure), its size can be reduced so as to be easily carried. Furthermore, the transmission control unit can be readily connected to the telephone line 52 via a public telephone by a simple manner such that this transmission control unit 1 is installed to the electronic device 50 which is usually directly connected to the telephone line. Furthermore, a calling can be made by a tone dial without any necessity of the turning of a dial or the pressing of push buttons. In addition, if the electric current adjustment means 5 is provided in the transmission control unit, the transmission control unit according to this embodiment can be used regardless of the type of the MODEM 51 included in the electronic device 50. However, if an electric current adjustment means having the similar function is provided in the electronic device 50, the electric current adjustment means 5 can be omitted. Furthermore, if the MODEM 51 is arranged to be a specified type, the electric current adjustment means 5 may be arranged to be a type which can generate constant voltage alternative to the variable voltage type electric current adjustment means.

When a high impedance magnetic speaker is employed as the speaker 9, the amplifier 8 employed as shown in FIG. 4 can be omitted. In addition, when a carbon type microphone is employed as the microphone 6, the amplifier 7 can be omitted.

What is claimed is:

1. A transmission control unit, for supplying an electronic output signal from a MODEM included in an electronic device as an acoustic output signal to a telephone, and for supplying an acoustic input signal from the telephone as an electronic input signal to the MODEM, comprising:

acoustic input means for receiving the acoustic input signal from the telephone and generating an electronic input signal therefrom;

acoustic output means for receiving an electronic output signal from the MODEM and generating an acoustic output signal to the telephone therefrom;

a pair of electronic input and output terminals connectable to corresponding terminals of the MODEM of the electronic device; and matrix conversion means for converting two-wire connection of said input and output terminals with the MODEM to four-wire connection with said acoustic input means and said acoustic output means, wherein said matrix conversion means includes a resistor bridge circuit formed by three resistors in said transmission control unit, of which a first resistor (R50) is connected between a first terminal (T5) and a second terminal (T3), a second resistor (R52) is connected between said second terminal and a third terminal (T6), and a third resistor is connected between said third terminal and a fourth terminal (T4), said second and fourth terminals being connected to said acoustic input means, said first and third terminals being connected to said acoustic output means, and said first and third terminals being connected to said pair of input and output terminals of said transmission control unit.

2. A transmission control unit according to claim 1, wherein said second resistor is a variable resistor for adjusting the resistor bridge circuit to an equilibrium upon connection of the unit with a MODEM.

3. A transmission control unit according to claim 1, wherein an inner A.C. resistor is disposed in the MODEM and is connected across the terminals of the MODEM.

4. A transmission control unit, for supplying an electronic output signal from a MODEM included in an electronic device as an acoustic output signal to a telephone, and for supplying an acoustic input signal from the telephone as an electronic input signal to the MODEM, comprising:

acoustic input means for receiving the acoustic input signal from the telephone and generating an electronic input signal therefrom;

acoustic output means for receiving an electronic output signal from the MODEM and generating an acoustic output signal to the telephone therefrom;

a pair of electronic input and output terminals connectable to corresponding terminals of the MODEM of the electronic device;

matrix conversion means for converting two-wire connection of said input and output terminals with the MODEM to four-wire connection with said acoustic input means and said acoustic output means; and electric current adjustment means connected between said matrix conversion means and said pair of input and output terminals for adjusting a loop current flowing through said terminals to be substantially constant.

5. A transmission control unit according to claim 4, wherein said electric current adjustment means is a variable voltage generator connected in series between said matrix conversion means and one of said pair of input and output terminals, so that said transmission control unit can be connected to any type of MODEM.

6. A transmission control unit according to claim 4, wherein said electric current adjustment means is a constant voltage generator connected in series between said matrix conversion means and one of said pair of input and output terminals, so that said transmission control unit can be connected to a particular type of MODEM.

7. A transmission control unit according to claim 4, wherein said matrix conversion means includes a resistor bridge circuit formed by three resistors in said transmission control unit, of which a first resistor (R50) is connected between a first terminal (T5) and a second terminal (T3), a second resistor (R52) is connected between said second terminal and a third terminal (T6), and a third resistor is connected between said third terminal and a fourth terminal (T4), said second and fourth terminals being connected to said acoustic input means, said first and third terminals being connected to said acoustic output means, and said first and third terminals being connected to said pair of input and output terminals of said transmission control unit.

8. A transmission control unit according to claim 7, wherein said second resistor is a variable resistor for adjusting the resistor bridge circuit to an equilibrium upon connection of the unit with a MODEM.

9. A transmission control unit according to claim 4, wherein an inner A.C. resistor is disposed in the MODEM and is connected across the terminals of the MODEM.

* * * * *